(12) United States Patent
Belinsky et al.

(10) Patent No.: US 8,266,210 B2
(45) Date of Patent: Sep. 11, 2012

(54) SHARED FEED READER AND METHOD OF SHARED FEED READING

(75) Inventors: Eran Belinsky, Haifa (IL); Ido Guy, Haifa (IL); Michal Jacovi, Rakefet (IL); Elad Shahar, Rehovot (IL); Eyal Sonsino, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/225,578

(22) Filed: Sep. 6, 2011

(65) Prior Publication Data

US 2011/0320533 A1    Dec. 29, 2011

Related U.S. Application Data

(62) Division of application No. 12/405,291, filed on Mar. 17, 2009, now abandoned.

(51) Int. Cl.
*G06F 15/16* (2006.01)
(52) U.S. Cl. .................. 709/204; 709/205; 709/217
(58) Field of Classification Search .......... 709/202–207, 709/217–224
See application file for complete search history.

(56) References Cited

U.S. PATENT DOCUMENTS

| | | | |
|---|---|---|---|
| 5,991,751 A | 11/1999 | Rivette et al. | |
| 2006/0173985 A1 | 8/2006 | Moore | |
| 2006/0200483 A1 | 9/2006 | Gorzela et al. | |
| 2007/0094391 A1 | 4/2007 | Nussey | |
| 2007/0110231 A1 | 5/2007 | Bales et al. | |
| 2007/0185884 A1* | 8/2007 | Kantamneni | 707/10 |
| 2007/0220016 A1 | 9/2007 | Estrada et al. | |
| 2007/0244895 A1 | 10/2007 | Mohler et al. | |
| 2008/0157960 A1 | 7/2008 | Muller et al. | |
| 2011/0138062 A1* | 6/2011 | Bansod et al. | 709/227 |

OTHER PUBLICATIONS

Feedest.Com http://www.feedest.com/.
Feeds.Reddit http://www.solutionwatch.com/429/feedsreddit-social-feed-reader/.
RSS Reader http://vowe.net/archives/004157.html.
Robby on Rails http://www.robbyonrails.com/articles/2007/08/21/collaborative-bookmarking-unleashed.
Libreria Universitaria http://www.libreriauniversitaria.it/collaborative-filtering-with-rss-research/book/9783836425445. Linn Marks Collins et al., "ScienceSifter: Facilitating Activity Awareness in Collaborative Research Groups through Focused Information Feeds", Source: http://library.lanl.gov/cgi-bin/getdoc?event=lww&document=79_collins_1.pdf.
Release Notes for XWiki Watch 1.0 Source: http://www.xwiki.org/xwiki/bin/view/Main/ReleaseNotesWatch10.
Saving RSS: Why Meta-feeds will triumph over Tags Source: http://billburnham.blogs.com/burnhamsbeat/2005/01/saving_rss_why_.html.

* cited by examiner

*Primary Examiner* — David Lazaro
(74) *Attorney, Agent, or Firm* — Daniel Kligler

(57) ABSTRACT

A shared feed reader for multiple users and a method for sharing feed reading are provided which provide group collaboration features. The shared feed reader includes a server including a processor hosting the shared feed reader for remote access by multiple users, and a user interface for each of the multiple users including an aggregator of web feeds subscribed to by the user. The shared feed reader includes: a mechanism for defining a group of users, wherein web feeds subscribed to by users in the group are exposed to the other users in the group; and a mechanism for sharing a read status of a web feed post across the group, wherein the read status indicates which users have read the post. The shared feed reader may also include a mechanism for receiving a meta-feed of meta-posts, wherein meta-feeds and meta-posts relate to activities of users in the group on shared feeds and posts.

19 Claims, 6 Drawing Sheets

SHARED FEED READER AND METHOD OF SHARED FEED READING

CROSS-REFERENCE TO RELATED APPLICATIONS

This Application is a divisional of application Ser. No. 12/405,291, filed 17 Mar. 2009.

FIELD OF THE INVENTION

This invention relates to the field of web feed readers. In particular, the invention relates to a shared web feed reader with collaborative features.

BACKGROUND OF THE INVENTION

The information revolution has seen an increase both in the frequency at which new information is generated and in its volume. New findings and developments in science, technology, finance and law require people to keep up to date so as not to lag behind the competition.

Keeping up to date requires first finding all the relevant resources, and then scanning them periodically. Feed readers have emerged as one of the prominent web 2.0 applications. A feed reader, also known as RSS reader or feed aggregator, is usually based on RSS or Atom standards. RSS is a family of formats including Rich Site Summary (RSS 0.91), RDF Site Summary (RSS 0.9 and 1.0), and Really Simple Syndication (RSS 2.0).

Aggregators reduce the time and effort needed to regularly check websites for updates, creating a unique information space or "personal newspaper." Once subscribed to a feed, an aggregator is able to check for new content at user-determined intervals and retrieve the update. The content is sometimes described as being "pulled" to the subscriber, as opposed to "pushed" with email or IM. Unlike recipients of some "pushed" information, the aggregator user can easily unsubscribe from a feed.

However, as feeds keep streaming new posts, and as new feeds appear, the task of going over all posts in one's feed reader becomes overwhelming. The difficulty is twofold: for one, the sheer amount of posts may be very large; but on top of that, the quality of posts is not unified, and thus one is first faced with the task of filtering, and then with the task of actually reading. An individual can only read a limited amount of information.

The same problem can be observed in a group of people who are working together. Each of the group members faces the problem individually. But also, as a group, the members want to keep up to date on current developments. In a group, this does not mean that each member has to read all items of relevance. It is enough that only the relevant members of the group keep-up-date on the items most relevant to them in a way that supports the operation of the entire group.

There are many existing feed readers. One example is Google Reader (Google is a trade mark of Google, Inc.). Google Reader has a public page in which a user can expose his feeds which can be provided as a feed to other users. Personal feed collections allow users to peek into other users' feeds (e.g., in the case of following a mentor and getting to know a new field by the feeds already collected by the mentor). The public page can include the user's comments on the web feeds. Standard features also include tagging and rating feeds or posts. Posts can typically be browsed by feed, by date, or you could see an aggregated feed of all the feeds you subscribe.

Support also exists for feed collections. Topical feed collections allow users to gather feeds about a specific topic, and later view all posts of all feeds. Topical feed collections are typically of a community and the whole community gathers feeds into the collection.

An aim of the present invention is to address the problem of covering a field of interest by a group of users. A further aim is to collaborate on the filtering of feeds by a group of users.

SUMMARY OF THE INVENTION

According to a first aspect of the present invention there is provided a shared feed reader for multiple users, comprising: a server including a processor hosting the shared feed reader for remote access by multiple users; a user interface for each of the multiple users including an aggregator of web feeds subscribed to by a user; a mechanism for defining a group of users, wherein web feeds subscribed to by users in the group are exposed to the other users in the group; a mechanism for sharing a read status of a web feed post across the group, wherein the read status indicates which users have read the post; wherein any of said mechanism for defining a group of users and mechanism for sharing a read status are implemented in either of computer hardware or computer software and embodied in a computer readable medium.

According to a second aspect of the present invention there is provided a shared feed reader for multiple users, comprising: a server including a processor hosting the shared feed reader for remote access by multiple users; a user interface for each of the multiple users including an aggregator of web feeds subscribed to by the user; a mechanism for defining a group of users, wherein web feeds subscribed to by users in the group are exposed to the other users in the group; a mechanism for exposing a meta-feed of meta-posts, wherein meta-feeds and meta-posts relate to activities of users in the group on shared feeds and posts; wherein any of said mechanism for defining a group of users and mechanism for exposing a meta-feed of meta-posts are implemented in either of computer hardware or computer software and embodied in a computer readable medium.

According to a third aspect of the present invention there is provided a method of collaboration in a shared feed reader for multiple users, comprising: hosting a computer-based shared feed reader for remote access by multiple users; aggregating web feeds subscribed to by a user; defining a group of users, wherein web feeds subscribed to by users in the group are exposed to the other users in the group; and sharing a read status of a web feed post across the group, wherein the read status indicates which users have read the post; wherein any of said steps are implemented in either of computer hardware or computer software and embodied in a computer-readable medium.

According to a fourth aspect of the present invention there is provided a computer program product for collaboration in a shared feed reader for multiple users, the product program product comprising: a computer readable medium; computer program instructions operable to: host a shared feed reader for remote access by multiple users; aggregate web feeds subscribed to by a user; define a group of users, wherein web feeds subscribed to by users in the group are exposed to the other users in the group; and share a read status of a web feed post across the group, wherein the read status indicates which users have read the post; wherein said program instructions are stored on said computer readable medium.

According to a fifth aspect of the present invention there is provided a method of providing a service to a client over a network comprising: hosting a computer-based shared feed reader for remote access by multiple users; aggregating web feeds subscribed to by a user; defining a group of users, wherein web feeds subscribed to by users in the group are exposed to the other users in the group; and sharing a read status of a web feed post across the group, wherein the read status indicates which users have read the post; wherein any of said mechanism for defining a group of users and mechanism for sharing a read status are implemented in either of computer hardware or computer software and embodied in a computer readable medium.

The described shared feed reader and method provide enhanced group collaboration features that provide awareness, sharing, and coordination, to allow users to cope better with information discovery and overload.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

Figure 1:
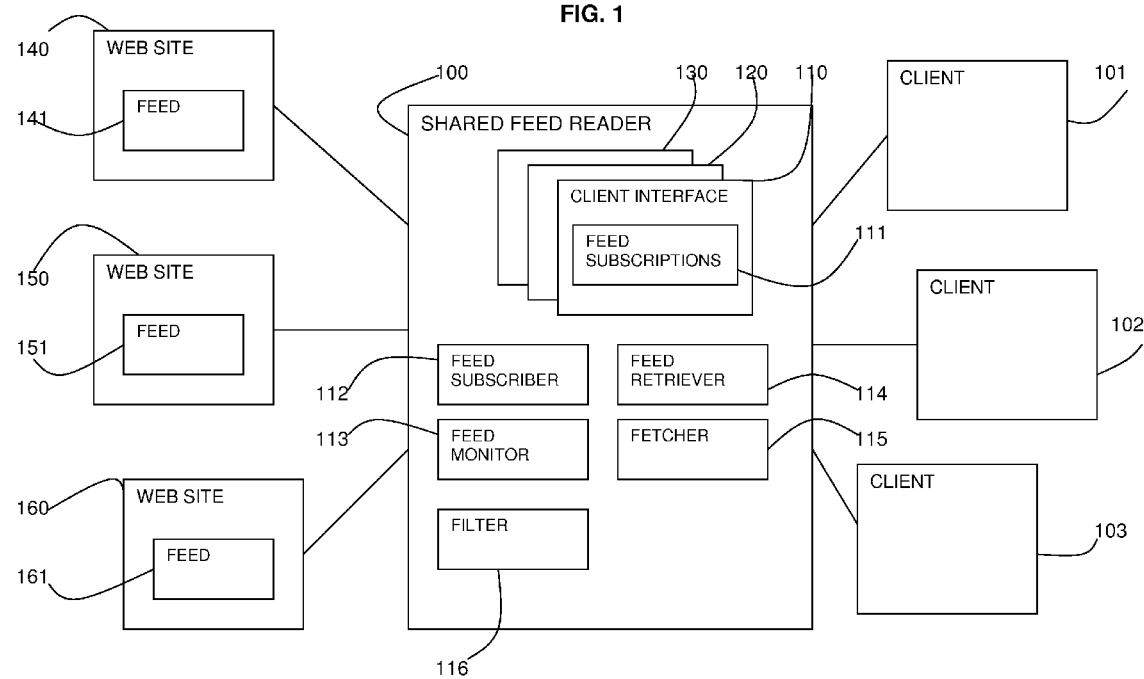
FIG. 1 is a block diagram of a shared feed reader as known in the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The use of web feeds is growing rapidly as a means of obtaining updated information on a range of subjects. Feed readers are used to obtain and display the web feeds for a client or for a group of users. Feed readers may be web-based feed readers which are hosted on remote servers. Another form of feed reader is in the form of client software designed to collect web feed subscriptions locally at a client.

Shared feed readers allow access by multiple users who may each have their own login to allow personal and shared feeds to be accessed.

The basic functionalities of a feed reader include:
Adding/removing feeds to the reader;
Receiving posts from feeds and viewing them in typical feeds lists/posts lists/display area;
Indicating which feeds have new posts and which feeds are read or unread (typically through boldface font);
Viewing all posts of all feeds at once or focusing on the posts of specific feeds; and
Viewing a post title/full post data/actual web content.

A web feed (also known as a syndicated feed) is a data format used for providing users with frequently updated content. The purpose of a web feed is to allow content providers (such as web site owners) to push information to content consumers. Web feeds are operated by many news web sites, weblogs, schools, and podcasters. Content distributors syndicate a web feed, thereby allowing users to subscribe to it.

In the typical scenario of using web feeds, a content provider publishes a feed link on their site which end users can register to with a feed reader.

The kinds of content delivered by a web feed are typically HTML (hypertext markup language) documents providing web page content, or links to web pages and other kinds of digital media. Often when web sites provide web feeds to notify users of content updates, they only include summaries in the web feed rather than the full content itself.

Web feed collections are groups of web feeds which share a common category. A web feed collection may be a group of web feeds that relate to a given topic which are gathered together to enable users to subscribe to the group of web feeds by topic, and later view all posts of all feeds. Personal feed collections allow users to obtain other users' feed groups in order to benefit from the other user's selection of web feeds.

Referring to FIG. 1, a shared feed reader system is shown. The shared feed reader 100 has multiple clients 101-103 each of which have a client interface 110-130 at the feed reader 100. Each client interface 110 may include subscriptions 111. The feed reader 100 obtains feeds 141-161 exposed on web sites 140-160.

The feed reader 100 includes a feed subscriber 112 for listing the feeds subscribed to by the clients 101-103, a feed monitor 113 for checking for new content at defined intervals, a feed retriever 114 for retrieving update posts of the feeds, and a fetcher 115 for fetching content linked to by a post. A feed reader 100 may also include a filter 116 to sort and filter retrieved posts into navigable categories.

Figure 2:
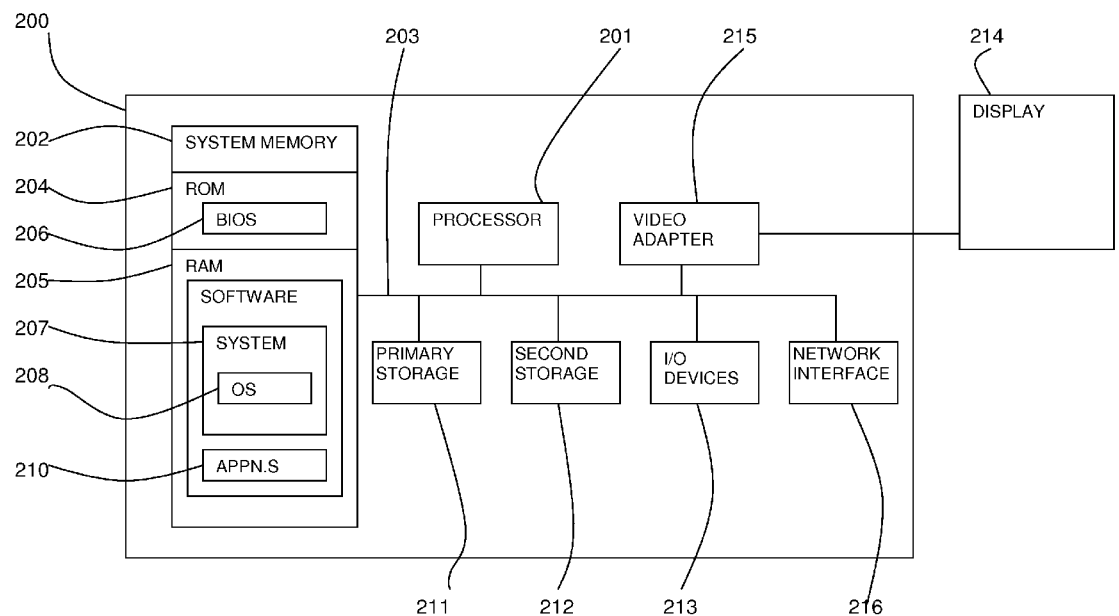
FIG. 2 is a block diagram of a computer system in which the present invention may be implemented.

Referring to FIG. 2, an exemplary system for implementing a server for hosting a shared feed reader and for implementing clients includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

The described shared feed reader has the aim of leveraging a group of people in order to cover a topic. If people know someone else's needs, and that person trusts them to notify him when there is something interesting—the person can save the time of sifting through feeds and posts which trusted people in his network have read. If there is something really important in those posts they will tell him about it. Thus, a group of people can potentially cover many more feeds than each individual, and in total, more people will get more relevant information.

Figure 3:
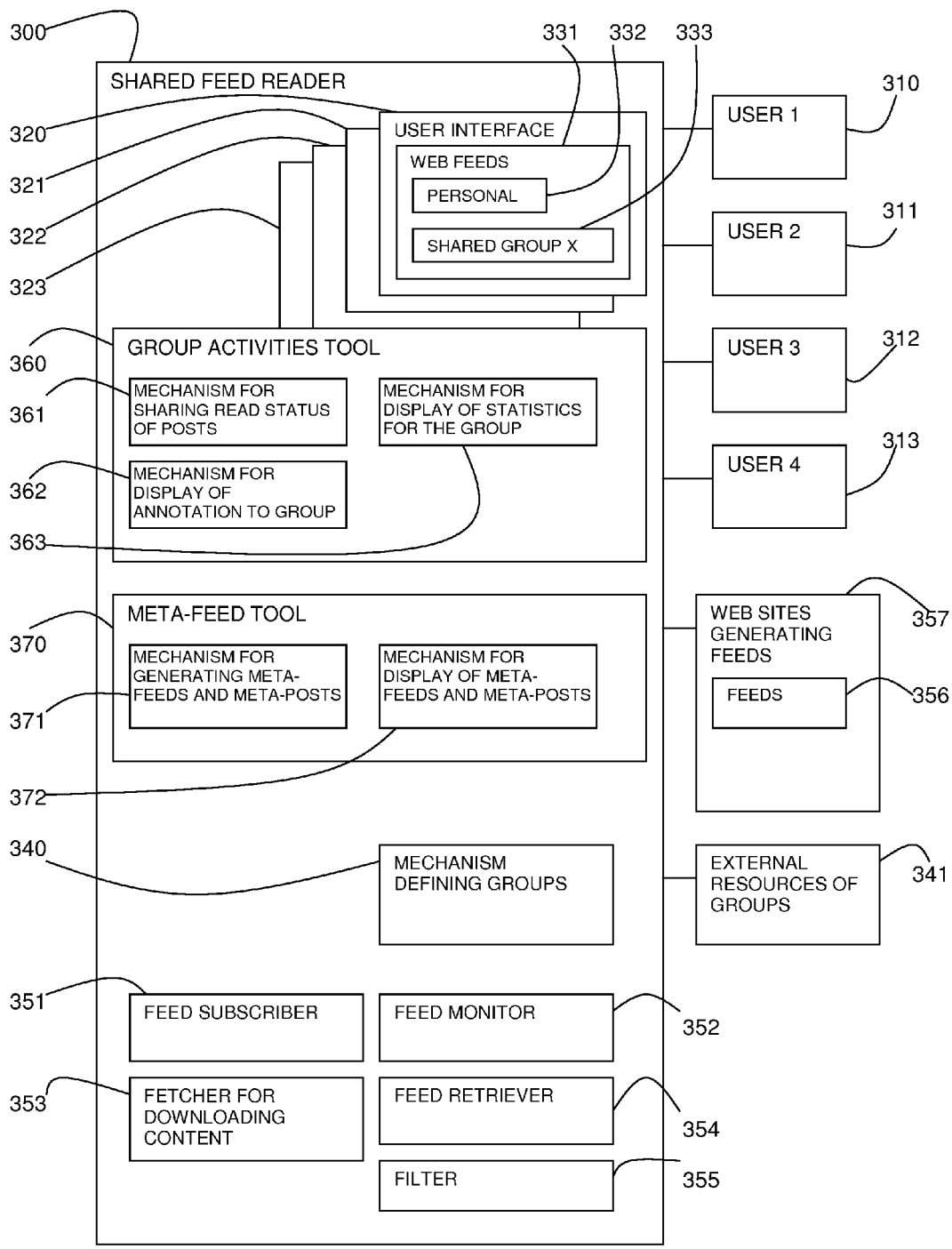
FIG. 3 is a block diagram of a shared feed reader in accordance with the present invention.

Referring to FIG. 3, an embodiment of a shared feed reader system is shown. The shared feed reader 300 supports multiple users 310-313. Each user 310-313 has a user interface 320-323 though which a user can subscribe to feeds 331 which may be defined as personal feeds 332 and shared feeds 333.

The shared feed reader 300 pulls feeds 356 from web sites 357 who expose feeds 356 subscribed to by the users 310-313. The shared feed reader 300 includes the general feed reader components of a feed subscriber 351 for listing the feeds subscribed to by the users 310-313, a feed monitor 352 for checking for new content at defined intervals, a feed retriever 354 for retrieving update posts of the feeds, and a fetcher 353 for fetching content linked to by a post. The feed reader 300 may also include a filter 355 to sort and filter retrieved posts into navigable categories.

The described shared feed reader 300 includes a mechanism for defining groups 340 of users which may use external resources of groups 341 for definition. For example, organizational structures may be used to define working groups, social applications may be used to define social network groups, etc. A user 310-313 can belong to one or more groups and may define the feeds the shares 333 with a group. Alternatively, the group may define the group feeds which all the users 310-313 which are members of the group will subscribe to.

The described shared feed reader 300 includes a group activities tool 360. The group activities tool 360 supports awareness between members of a group as to the activities of the other members of the group. The group activities tool 360 includes the following components. A mechanism for sharing read status of posts 361 by which users in a group can see who has read a post. A mechanism for display of annotation by the group 362 by which a user can assign another user to read a post, can request another user read a post, can request a summary of the post, can add a summary of the post, can commit to read a post, or can recommend or tag a post. A mechanism for display of statistics of the group 363

Additionally or alternatively to the group activities tool 360, the shared feed reader 300 may include a meta-feed tool 370. A meta-feed is defined as a feed which relates to user actions on a feed or collection of feeds. Posts within a meta-feed are referred to as meta-posts and provide an update of an action of a user. Meta-feeds are exposed by the feed reader 300 which provide this function for a group of users.

The meta-feed tool 370 includes a mechanism for generating and exposing 371 a meta-feed with meta-posts of user activity at the feed reader 300 and a mechanism for display 372 of meta-feeds and meta-posts to users in the group in a distinguished manner.

The following are types of features supported by the described shared feed reader which can aid a group in covering a topic.

Defining Groups

A user may belong to quite a few different groups where members know each other's needs and trust each other to provide notifications of items of interest. The shared feed reader may provide means to define these groups in several ways:

Formal groups may be specified according to the organizational chart of an organization, or according to membership in a project. These groups typically have common goals and division of labour such that people know each other's needs and interests, and people are interested in drawing the attention of others to items of importance, to advance not just the knowledge of the notified individual, but to benefit the entire group.

Social network groups are based on social ties. Although social ties do not imply a common goal, they often do imply familiarity, trust and caring. This social network information could be extracted from external applications, or it could be specified explicitly in the feed reader.

Topic-based communities may be formed by enrolling members who, together, cover a set of feeds they collaboratively collect.

Coverage Indications for Feeds and posts

A user may become aware of the following details:

Which feeds were committed to be read (and by whom)—thus other users can visually see if all feeds are committed to be read, and otherwise assign users to read them. Every member as an individual of the group can see which feeds are committed to be read. In one embodiment, people who are not members of the group may also see commitments to read feeds by the group, unless the group specifies a privacy option.

Which posts were actually read (and by how many, and by whom)—thus users can visually tell which posts were read and which were not covered. It may also learn the reputation of users as readers (reads a lot or not; meet their commitments or not; etc.).

List of readers per item: each feed item title is decorated with the number of users that have already read it. In one embodiment, hovering over the number reveals the full list of readers, other embodiments may include clicking on an activator (link, button, etc.). Presenting the readers of an item before the user reads it serves for social navigation: in some cases it can attract the user to read the item as well; in others it may spare the user from reading the item, knowing that had it been an important item, it would have been recommended.

Recommending Posts and Feeds

A user may become aware of the following details:

What score a post received—thus each member of the group may make sure to read the posts with high score, while skipping those that were read by others and received a low score.

Summaries or annotations left by group members—thus allowing others to skim through and only read summaries rather than full posts. Summaries may be implemented using personal blogs, or as add-ons to the reader (like tags and annotations).

Requests for coverage—users may add important feeds to their readers or to the group, but not have the time to cover them. They may indicate that they ask the group to cover, to allow others to volunteer to commit to reading these feeds. Requests for coverage may be published in hope that someone commits to them, or they may be assigned as "invitations", to which the receiver may accept, decline, or delegate.

Recommended posts—users may indicate personal recommendations—recommending to a user (or group of users) to read a certain post as they know it would be of interest to the user (or group) based on their familiarity.

The Following Features Support Coverage of Information:

Views: Each person has his own feeds which he "covers"—in a "Personal Feeds" view. There is also a view which allows a user to see all feeds that the entire group is covering in a "Group feeds" view.

Adding Coverage Indication for Feeds: In both feed views, feeds are visually marked, e.g., by different background colours or hue, according to coverage by others—depending on the amount of readers of the feed and their social proximity to the user. This way the user can know which feeds are covered by other people in the group, and thus could perhaps give a well-covered feed a lower priority. For example, if the user wants to start reading a new feed from the "Group feeds" view, he might want to prefer less-covered feeds to provide better coverage for the group.

Adding Coverage Indication for Posts: When reading posts or an aggregated feed, information of coverage per post can be obtained. This would be determined by how many people in the group have read the post, and how strongly they are related to the user in his social network. A user could choose to not display posts which are already "covered" above a certain threshold, or the user can simply display the post with a grade or color which indicates how well covered it is. Another alternative is to sort posts by reverse coverage. Such mechanisms could allow several users who cover the same feed to split the work of reading the feed among them.

Add Yield Indication for Feeds: an additional ranking of feeds could be according to the number of posts from the feed which were actually recommended or highly rated by people in the group. Alternatively, the ratio of recommended posts (recommended post divided by all posts in feed) could be used, because a feed may have a lot of posts which include a lot of noise—such a feed could provide many good posts, but may also waste time of the readers who will need to go over many irrelevant posts.

An Activity Summary

An activity summary may be provided of: most read items, recently added feeds, top recommenders, and a short glance of recent actions of community members. The goal of the activity summary is to create a sense of community, encourage discussing commonly read items, and support serendipity.

Tagging

Tagging enables a user to tag an item and see how others tagged it. A tag cloud per user is presented, creating a profile of the user's reading interests.

Feed Statistics

Feed statistics are calculated and presented in a page that includes update frequency, number of recommendations of items from this feed, and coverage level—by each user and by the community as a whole. Coverage of a feed is calculated by measuring the number of items read out of the total items posted. Exploring the feed statistics page can have different effects: users may decide to remove a feed that is apparently not followed by them, or adopt a feed that is highly covered by others; alternatively users may decide to change their reading habits when discovering that an important feed is not well covered by the community.

The shared web feeder described in relation to FIG. 3 incorporates a meta-feed tool in which information on user activities on web feeds is provided as a web feed itself and displayed with web feeds in a feed reader or web site. This feature is described further below.

A "meta-feed" is defined as the stream of meta-information about a specific collection of feeds (e.g., the meta-information about a person's feed collection; or the meta-information about the Social Networks feed collection).

A meta-feed is exposed by a feed reader. The feed reader provides the user activity on the user's feed, or about the collective activity of a group of users. In one embodiment, the feed reader is web-based and thus a web site and the user activity on a feed or group activity is provided as a web application.

The collective behaviour of a user across all his/her feeds may also be syndicated as a meta-feed by simply aggregating all actions taken on the collection of feeds tracked by the user.

Examples of meta-information about feeds include:
adding/removing feeds from a collection;
user read a post;
user rated a post;
user commented on a post;
user recommended a post.

A "meta-post" is defined as a single item in a meta-feed (e.g., "User A read post X"; or "the feed 'SNNews' was added to the collection"). The described shared feed reader is enhanced feed readers by allowing users to subscribe to meta-feeds.

The meta-feeds are to be treated as feeds and incorporated it in the reader's view as other items, but their titles will indicate (e.g., through italicized font, of different coloured font) that they show meta-information. Thus meta-feeds will appear within the feed list (though their titles will be italicized), and meta-posts will appear in within the posts list (again, with italicized titles).

Clicking a meta-post may have different behaviors, depending on its type. For example:

Clicking on meta-posts indicating that a feed was added/removed, will open the posts list of the feed, allowing the user to study the feed and possibly decide to add the feed to his own reader.

Clicking on a meta-post indicating that a user read/rated/commented/or recommended a post, will open the post and show the additional information (rate, comment, recommendation), allowing the user to read too.

Meta-feeds require special treatment in two aspects:

Their exposure by feed readers that supports both "regular" feeds and meta-feeds should expose both in a distinguishable and suitable way.

Figure 4:
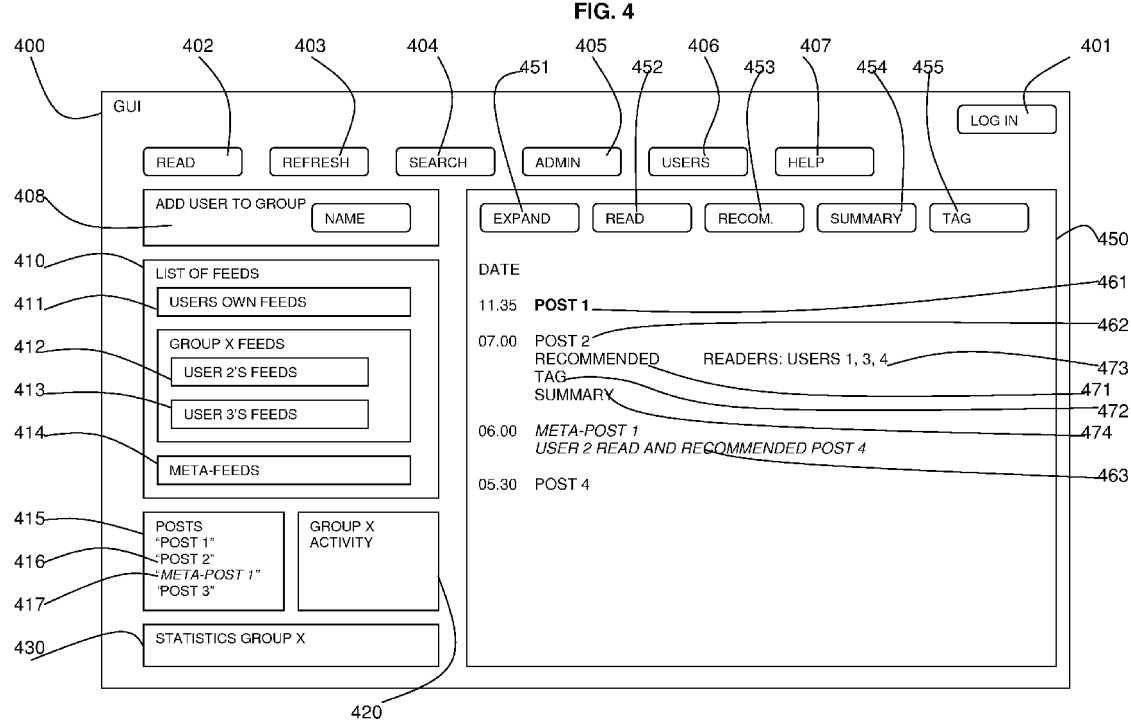
FIG. 4 is a schematic diagram of a graphical user interface of a shared feed reader in accordance with the present invention.

Their consumption in feed readers—feed readers should present meta-feeds the user is subscribed to and their corresponding entries in a special way Referring to FIG. 4, an embodiment of a shared feed reader graphical user interface (GUI) 400 is shown. GUIs may take many different forms and the following is an example to show how the described functions may be displayed.

The GUI 400 includes a login input 401 for a user to obtain the personalised view for that user. General menu options may include "Read" 402, "Refresh" 403, "Search" 404, "Admin" 405, "Users" 406, and "Help" 407. The "Users" 406 option may include options for defining user groups that a user belongs to. An input 408 allows another user to be located and added to a group in order to view the other users shared feeds.

Different views of the content of the GUI 400 may be provided when a user switches between groups he belongs to. For example, the ambience (e.g., background colour) could be used to help the user understand in which context he is—reading his personal feeds, reading the feeds as part of group X, reading the feeds as part of group Y, etc. Alternatively, the user interface might change and provide different functions. For example, in group mode (as opposed to personal reading mode) buttons may be provided for group functionality, such as for asking for volunteers to read a post/feed, volunteering to read a post, etc.—functions that are irrelevant in personal reading mode.

A first area of the GUI 400 may include a list of feeds 410 including user's personal feeds 411, feeds from users belonging to a group—these may be nested by user 412, 413, and meta-feeds relating to the users of the group 414.

A summary 415 of posts 416 using their headings only may be included in the GUI 400. This may be chronological or may be filtered into categories. The summary 415 of posts may include meta-posts 417 distinguished from the regular posts by italics or colour or another distinguishing method.

A group activity summary 420 may be provided giving a summary of most read items, recently added feeds, top recommenders, and a short glance of recent actions of community members.

A group statistics 430 may also be providing in which more detailed statistics on the group can be obtained.

In a second area 450 of the GUI 400, posts are listed in more detail and can be selected for full display. The second area 450 may include a sub-menu of operations which may be carried out on posts such as "Expand" 451, "Read" 452, "Recommend" 453, "Add Summary" 454, "Tag" 455. The "Read" 452 input option may include requests for others to read, assignment of another user to read, or a commitment by the user to read.

A post 461 may be shown in bold until it is opened and read. A post 462 may include annotations such as a recommendation 471, a tag 472, a display of readers or users committed to read 473, a summary 474 and other annotations of the described shared feed reader. A meta-post 463 may be shown in another style, such as italics, and may provide information on a group user action.

Figure 5:
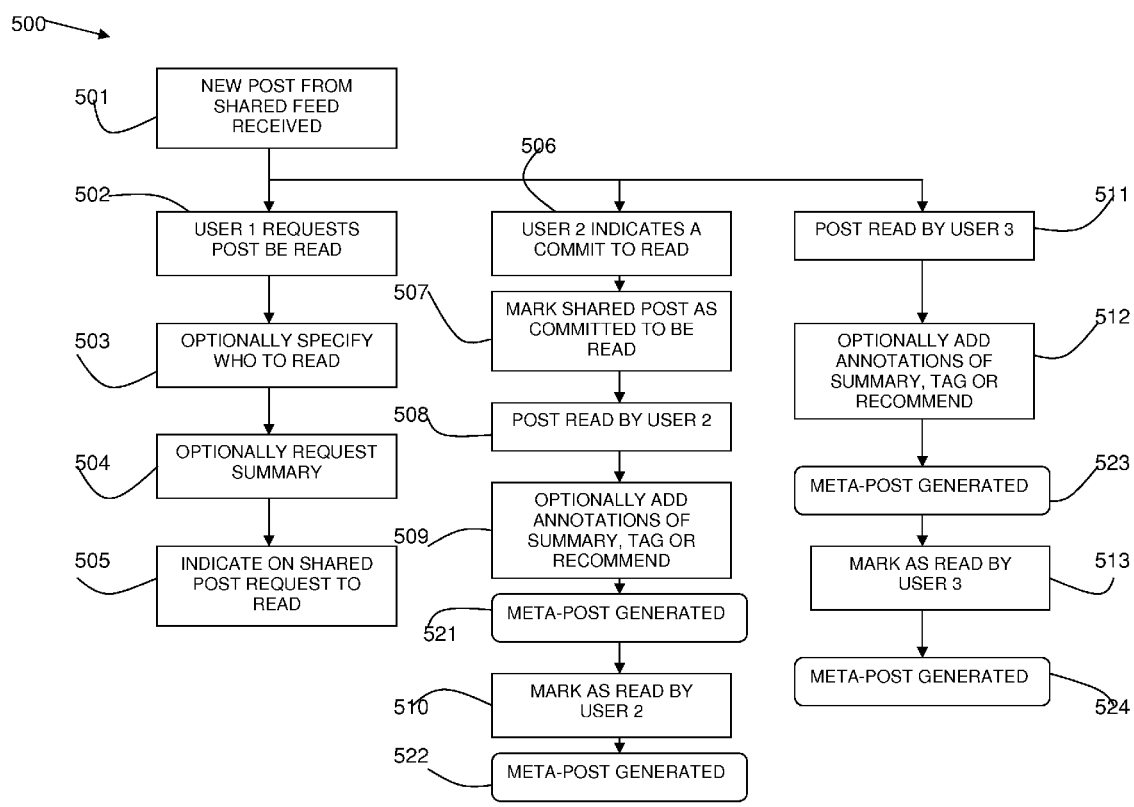
FIG. 5 is a flow diagram of a method in accordance with the present invention.

Referring to FIG. 5, a flow diagram 500 shows a method of sharing feed reads. A new shared post is received 501 by a group. One user, user 1, does not want to read the post himself, and requests 502 that the post be read by another member of the group. Optionally, he can specify 503 which other member of the group he would like to read the post. He can also optionally request 504 a summary of the post. An indication 505 is shown on the shared post of the request to read.

A second user, user 2, wants to read the post but not right away. User 2 indicates 506 a commit to read the post. The shared post is marked 507 as committed to be read by user 2. User 2 then reads 508 the post later. User 2 can optionally add annotations 509 such as a summary, tag or recommend the post to others in the group. The post is marked 510 as read by user 2 with any annotations which can be seen by the others in the group.

A third user, user 3, reads 511 the shared post immediately. User 3 can optionally add annotations 512 such as a summary, tag or recommend the post to others in the group. The post is marked 513 as read by user 3 with any annotations which can be seen by the others in the group.

Meta-posts 521-524 are triggered and generated when a user carries out an action. For example, in the flow diagram of FIG. 5 the following meta-posts may be triggered. If user 2 annotates, tags or recommends the post 509, a meta-post is generated 521 of this activity. When user 2 marks 510 as read the post, a meta-post is generated 522. Similarly, if user 3 annotates, tags or recommends the post 512, a meta-post is generated 523 of this activity. When user 3 marks 513 as read the post, a meta-post is generated 524.

Figure 6:
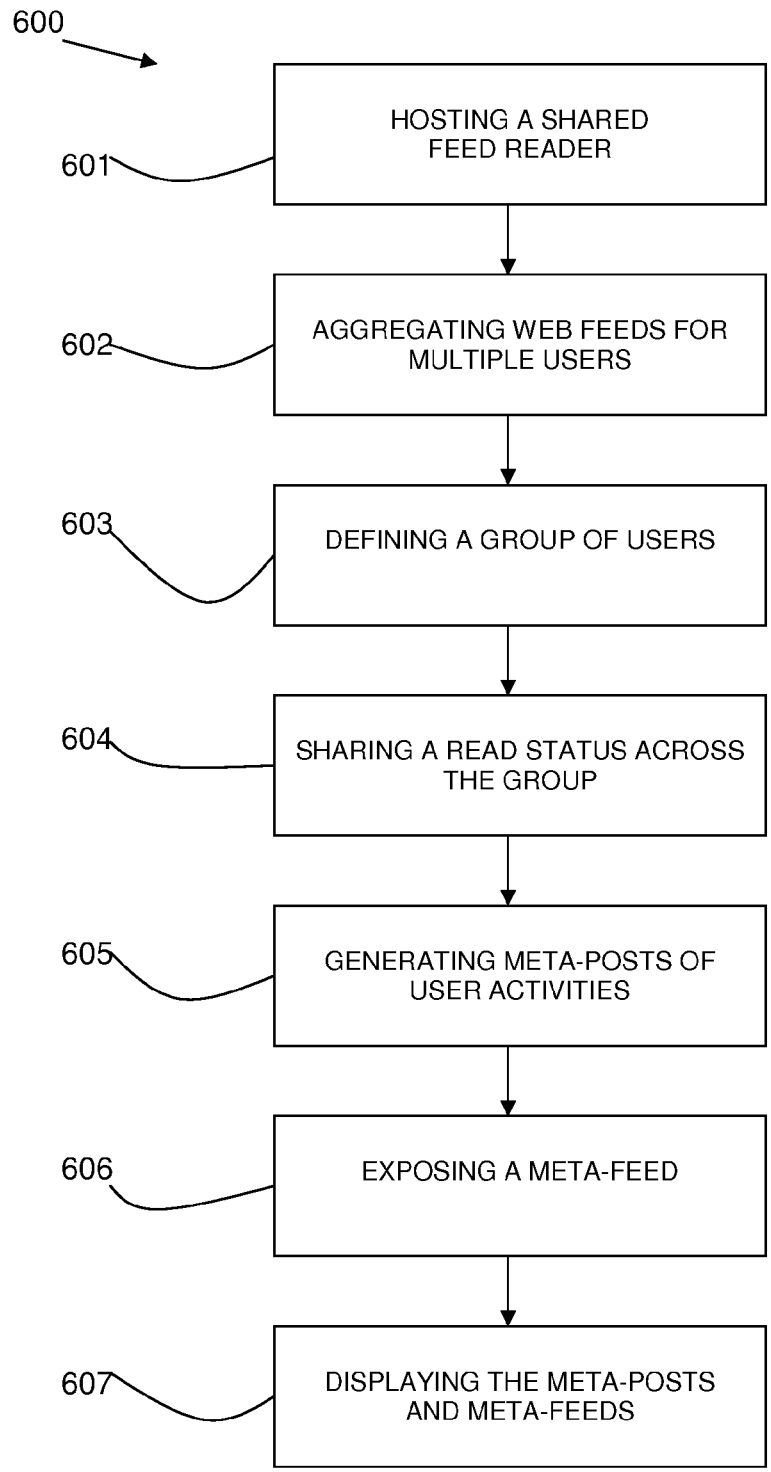
FIG. 6 is a flow diagram of a method in accordance with an aspect of the present invention.

Referring to FIG. 6, a flow diagram shows a method carried out at a server back end of a shared feed reader. The server hosts 601, a shared feed reader and aggregates 602 web feeds subscribed to by the multiple users of the shared feed reader. The feed reader defines 603 a group of users between which web feeds subscribed to by the users are shared and exposed to the other users. The feed reader shares 604 a read status of a web feed post across the group. The feed reader also generates 605 meta-posts relating to user activities in the feed reader which are exposed as a meta-feed 606 on the feed reader. The feed reader displays 607 the meta-feeds and meta-posts in a distinguished way from regular feeds and posts.

This unique combination of social and collaborative features creates a community environment that helps reducing information overload from users and make their reading more effective. On the one hand, they may rely on each other for filtering through numerous irrelevant items; on the other hand, by recommendations and collaborative coverage they may ensure they do not miss important items. Coverage may be achieved by a single (relevant) reader per post, the group as a whole can share the load of filtering and thus save individual's time.

A goal of the described shared feed reader is to assist in collaborative community coverage of shared feeds. By allowing the users to expose their feed list and reading habits, the aim is to transform the individual experience of feed reading into a more collaborative one, harnessing the power of the community to ensure users spend less time on the irrelevant items, while not missing out on the important ones.

The shared feed reader has the aim of providing a feed reading experience in a community, where people are familiar with each other's interests, so they know when an item is of interest; where trust already exists, so people can be trusted to let others know of the item; and where intimacy is achieved, so people are willing to share most of their reading habits. This scenario is relevant either among close friends or in a professional setting where reading habits are around a shared domain.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method of collaboration in a shared feed reader for multiple users, comprising the steps of:
hosting a computer-based shared feed reader for remote access by multiple users;
defining a group of users having members comprising subscribing members and non-subscribing members to web feeds, the web feeds comprising web feed posts;
recording respective indications of trust among the members;
aggregating the web feeds;
exposing the aggregated web feeds to the non-subscribing members;
making an assignment of selected ones of the web feed posts for reading by designated members, wherein making an assignment comprises:
receiving from one of the members a request that a new web feed post be read by another of the members; obtaining an indication of a commitment from the other member to read the new web feed post; recording the request and the indication to thereby define an assignment status of the new web feed post and sharing the assignment status across the group to inform the group of the assignment;
sharing respective read states of the web feed posts across the group, wherein the read states indicate which of the members have read the web feed posts;
receiving annotations in respect of the new web feed post from the other member;
storing the annotations and respective recommendations of the designated members for the selected web feed posts for access by the group; and
fetching the selected web feed posts for reading by non-designated members responsively to the respective indications of trust therebetween and responsively to the annotations and the recommendations of the designated members, wherein any of the steps are implemented in either of computer hardware or computer software and embodied in a computer-readable medium.

2. The method according to claim 1, wherein making an assignment further comprises requesting summaries of the web feed posts.

3. The method according to claim 1, exposing among the group respective commitment states that indicate which of the designated members have committed to reading the selected web feed posts.

4. The method according to claim 1, wherein recording respective indications of trust is performed by explicitly assigning the indications of trust.

5. The method according to claim 1, wherein recording respective indications of trust is performed by extracting the indications of trust from external applications.

6. The method according to claim 1, further comprising the steps of generating a meta-feed of meta-posts, wherein the meta-posts relate to activities of the members in respect of the web feed posts.

7. The method according to claim 1, wherein the request identifies the other member.

8. A computer software product for supporting collaboration in a shared feed reader by multiple users, including a non-transitory computer-readable storage medium in which computer program instructions are stored, which instructions, when executed by a computer, cause the computer to perform the steps of:
hosting a computer-based shared feed reader for remote access by multiple users;
defining a group of users having members comprising subscribing members and non-subscribing members to web feeds, the web feeds comprising web feed posts;
recording respective indications of trust among the members;
aggregating the web feeds by executing a feed monitor and a feed retriever;
invoking a group activities tool for exposing the aggregated web feeds to the non-subscribing members;
making an assignment of selected ones of the web feed posts for reading by designated members, wherein making an assignment comprises:
receiving from one of the members a request that a new web feed post be read by another of the members; obtaining an indication of a commitment from the other member to read the new web feed post; recording the request and the indication to thereby define an assignment status of the new web feed post and sharing the assignment status across the group to inform the group of the assignment;
sharing respective read states of the web feed posts across the group, wherein the read states indicate which of the members have read the web feed posts;
receiving annotations in respect of the new web feed post from the other member;
storing the annotations and respective recommendations of the designated members for the selected web feed posts for access by the group; and
fetching the selected web feed posts for reading by non-designated members responsively to the respective indications of trust therebetween and responsively to the annotations and the recommendations of the designated members, wherein at least one the steps is implemented in computer hardware.

9. The computer software product according to claim 8, wherein making an assignment further comprises requesting summaries of the web feed posts.

10. The computer software product according to claim 8, wherein the instructions cause the computer to perform the additional step of exposing among the group respective commitment states that indicate which of the designated members have committed to reading the selected web feed posts.

11. The computer software product according to claim 8, wherein recording respective indications of trust is performed by explicitly assigning the indications of trust.

12. The computer software product according to claim 8, wherein recording respective indications of trust is performed by extracting the indications of trust from external applications.

13. The computer software product according to claim 8, wherein the instructions cause the computer to perform the additional steps of generating a meta-feed of meta-posts, wherein the meta-posts relate to activities of the members in respect of the web feed posts.

14. A data processing system for web feed collaboration by multiple users, comprising:
a processor;
a memory accessible to the processor storing programs and data objects therein, the programs including a computer-based shared feed reader configured for remote access by multiple users, a group activities tool, a group definition mechanism, a feed monitor, a feed retriever, and a fetching module, wherein execution of the programs cause the processor to perform the steps of:

invoking the group activities tool to define a group of users having members comprising subscribing members and non-subscribing members to web feeds, the web feeds comprising web feed posts and recording respective indications of trust among the members;

invoking the feed monitor for aggregating the web feeds;

with the group activities tool exposing the aggregated web feeds to the non-subscribing members;

making an assignment of selected ones of the web feed posts for reading by designated members, wherein making an assignment comprises:

receiving from one of the members a request that a new web feed post be read by another of the members; obtaining an indication of a commitment from the other member to read the new web feed post; recording the request and the indication to thereby define an assignment status of the new web feed post and sharing the assignment status across the group to inform the group of the assignment;

sharing respective read states of the web feed posts across the group, wherein the read states indicate which of the members have read the web feed posts;

receiving annotations in respect of the new web feed post from the other member;

storing the annotations and respective recommendations of the designated members for the selected web feed posts for access by the group; and fetching the selected web feed posts for reading by non-designated members responsively to the respective indications of trust therebetween and responsively to the annotations and the recommendations of the designated members.

15. The data processing system according to claim 14, wherein making an assignment further comprises requesting summaries of the web feed posts.

16. The data processing system according to claim 14, wherein the processor is operative for exposing among the group respective commitment states that indicate which of the designated members have committed to reading the selected web feed posts.

17. The data processing system according to claim 14, wherein recording respective indications of trust is performed by explicitly assigning the indications of trust.

18. The data processing system according to claim 14, wherein recording respective indications of trust is performed by extracting the indications of trust from external applications.

19. The data processing system according to claim 14, further comprising a meta-feed tool, wherein execution of the programs cause the processor to invoke the meta-feed tool for generating a meta-feed of meta-posts, wherein the meta-posts relate to activities of the members in respect of the web feed posts.

* * * * *